US012461612B1

(12) United States Patent
Metodiev

(10) Patent No.: US 12,461,612 B1
(45) Date of Patent: Nov. 4, 2025

(54) DIGITAL FOUNTAIN PEN AND SYSTEM AND METHOD OF UTILIZING THE SAME

(71) Applicant: Wacom Co., Ltd., Saitama (JP)

(72) Inventor: Milen Dimitrov Metodiev, Sofia (BG)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/939,152

(22) Filed: Nov. 6, 2024

(51) Int. Cl.
*G06F 3/0354* (2013.01)

(52) U.S. Cl.
CPC ................ *G06F 3/03546* (2013.01)

(58) Field of Classification Search
CPC .................................... G06F 3/03546
USPC ........................................... 345/179
See application file for complete search history.

(56) References Cited

U.S. PATENT DOCUMENTS

| 2006/0140705 | A1* | 6/2006 | Kronenberger | ........ B43K 29/00 401/209 |
| 2014/0118313 | A1* | 5/2014 | Cheng | ................. G06F 3/03545 345/179 |
| 2015/0071694 | A1* | 3/2015 | Marino | ................. B43K 29/00 401/2 |
| 2016/0243879 | A1* | 8/2016 | Chan | ....................... B43K 5/18 |

* cited by examiner

*Primary Examiner* — Calvin C Ma
(74) *Attorney, Agent, or Firm* — Seed Intellectual Property Law Group LLP

(57) ABSTRACT

A digital fountain pen includes a nib with two tines made of a flexible material that defines a slit, wherein its slit width varies according to the pressure applied to the nib and/or the orientation of the digital fountain pen relative to a writing surface. The digital fountain pen also includes a sensor module configured to measure the variable slit width, an orientation detection module configured to determine the position and tilt of the pen relative to the writing surface, and a communication module configured to transmit the slit width data and/or the orientation data to a connected computing device. The computing device utilizes the slit width data and the orientation data to dynamically control an amount of digital ink dispensed onto a digital paper, thereby simulating the writing experience and ink output of a stationery fountain pen.

20 Claims, 12 Drawing Sheets

DIGITAL FOUNTAIN PEN AND SYSTEM AND METHOD OF UTILIZING THE SAME

BACKGROUND

Technical Field

The present disclosure relates to the field of digital pens, and in particular, relates to a digital fountain pen and system and method of utilizing the same.

Description of the Related Art

With the fast-growing adaptation of digital writing pads, such as tablets, electronic boards, pen tablets, and the like, people have started taking more and more notes in the form of handwritten data in handwritten documents provided by the digital writing pads. The handwritten documents provide various advantages over typed documents, such as a personal touch of a user's handwriting, an authenticity that is especially important in legal or historical documents, flexibility to customize and personalize based on personal requirements of font or color or style, and time-saving by allowing quick note taking.

However, the traditional digital pens, commonly employed with the digital writing pads, such as computers, mobile phones, tablets, Personal Digital Assistants (PDA), or the like, are typically designed with cylindrical nibs or cone-shaped nibs featuring rounded tips. These existing digital pens present significant limitations in replicating the tactile and visual writing experience provided by traditional stationery fountain pens. One primary issue with current digital pens is their inability to mimic the interaction between a traditional fountain pen's nib and the writing surface. Such inability leads to an awkward or unnatural writing experience which lacks dynamic variability of a line width or ink flow characteristics of a stationery fountain pen.

Additionally, existing digital pens fail to offer optimum control over the ink output during writing, unlike traditional fountain pens, leading to a less authentic representation of handwriting or drawing. Such non-dynamic ink flow control in traditional digital pens fails to capture organic variations seen in fountain pen writing, where the ink flow is influenced by the pressure applied by the user and/or the angle at which the user is writing.

Therefore, there is a need for an improved digital pen that can provide a more satisfactory writing experience and better control over ink output that closely emulates the functionality and feel of a stationery fountain pen.

BRIEF SUMMARY

One or more embodiments are directed to a digital fountain pen, and a system and method of utilizing the same. The digital fountain pen and an associated mechanism emulate the writing experience of a traditional stationery fountain pen, addressing the limitations of existing digital pens. In order to do so, the digital fountain pen has a specially designed nib and advanced sensing technology to replicate the tactile and visual aspects of fountain pen writing. This nib consists of two tines made from a flexible material, with a slit between them whose width varies depending on the pressure applied and the orientation of the digital fountain pen relative to a writing surface. Further, this variation in slit width is utilized for selecting the ink flow and stroke width to mimic the behavior of the traditional fountain pen's nib.

For accurately capturing and utilizing the variations in slit width, the digital fountain pen is equipped with a sensor module. The sensor module includes capacitor plates embedded within the two tines of the nib, such that as the slit width changes, the capacitance between these plates varies, which is then detected by an electronic circuit. Various methods can be employed to measure these capacitance changes, including LRC circuits, oscillator circuits, bridge circuits (like the Wheatstone bridge), time constant measurement techniques, and specialized integrated circuits designed for capacitance sensing. These measurements are converted into digital signals that represent the real-time slit width. In addition to the sensor module for measuring slit width, the digital fountain pen also includes an orientation detection module that determines the position and tilt of the digital fountain pen, providing data such as X and Y coordinates and XTilt and YTilt angles. This comprehensive set of data allows for precise control over the writing dynamics, such that a computing device, i.e., digital writing pads (such as tablets, electronic boards, pen tablets, and the like) can adjust the stroke width and ink density based on both the slit width and the pen's orientation.

For such adjustments, the digital fountain pen communicates the slit width data and orientation data to the connected computing device through a communication module, which may utilize wireless communication protocols for seamless data transmission. The computing device, equipped with a processor and memory, interprets the received data to control the digital ink output on a display screen that functions as digital paper. The software dynamically adjusts the stroke width and ink density, creating an authentic writing experience that closely mirrors that of using a traditional fountain pen.

An embodiment of the present disclosure relates to a digital fountain pen. The digital fountain pen includes a nib having two tines made of a flexible material and defining a slit with a variable slit width that varies according to the pressure applied to the nib and/or the orientation of the digital fountain pen relative to a writing surface. The two tines of the nib are made of a metal alloy that provides both flexibility and durability, allowing consistent performance under varying pressure and orientation.

In an embodiment, the digital fountain pen also includes a sensor module to measure the variable slit width. The sensor module further includes two capacitor plates incorporated within the two tines, an electronic circuit for detecting changes in capacitance between the two capacitor plates as the slit width varies, and a digital converter for converting the detected capacitance into digital signals representing the slit width. In an embodiment, the sensor module includes an LRC circuit configured to measure resonant frequency changes caused by variations in the slit width, with the resonant frequency changes being converted into corresponding slit width measurements. In an embodiment, the sensor module includes an oscillator circuit to detect frequency shifts corresponding to changes in the slit width and convert them into the slit width data. In an embodiment, the sensor module includes a bridge circuit to compare the capacitance of the slit width with a reference capacitor for detecting variations in the slit width. In an embodiment, the sensor module is configured to measure a time constant of a capacitor charging and discharging through a resistor that is indicative of the slit width.

In an embodiment, the digital fountain pen also includes an orientation detection module to determine position and tilt of the digital fountain pen relative to the writing surface to provide orientation data. The orientation data includes X coordinate, Y coordinate, XTilt angle, and/or YTilt angle.

In an embodiment, the digital fountain pen also includes a communication module to transmit the slit width data and/or the orientation data to a connected computing device. The communication module employs wireless communication protocols to transmit the slit width data and orientation data to the connected computing device. Further, the computing device utilizes the slit width data and the orientation data to dynamically control an amount of digital ink dispensed onto a digital paper, thereby simulating the writing experience and ink output of a stationery fountain pen. The computing device dynamically controls the amount of digital ink dispensed onto the digital paper by adjusting stroke width and ink density on the digital paper based on interpretation of the slit width data and orientation data. In an embodiment, the nib's tip width is a pre-defined constant conveyed to the computing device, such that the computing device utilizes the pre-defined constant in combination with the slit width data to compute the stroke width.

An embodiment of the present disclosure relates to a system for writing on digital paper utilizing a digital fountain pen. The system includes a digital fountain pen and a computing device. In an embodiment, the digital fountain pen includes a nib having two tines that define a slit with a variable slit width that varies according to the pressure applied to the nib and/or the orientation of the digital fountain pen relative to a writing surface. The digital fountain pen includes a sensor module to measure the variable slit width. The sensor module further includes two capacitor plates incorporated within the two tines, an electronic circuit for detecting changes in capacitance between the capacitor plates as the slit width varies, and a digital converter for converting the detected capacitance changes into digital signals representing the slit width. Further, the digital fountain pen includes an orientation detection module to determine the position and tilt of the digital fountain pen relative to the writing surface, to provide orientation data including X coordinate, Y coordinate, XTilt angle, and/or YTilt angle. The digital fountain pen also includes a communication module to transmit the slit width data and/or the orientation data.

In an embodiment, the computing device receives the slit width data and the orientation data from the digital fountain pen. Further, the computing device includes a processor, a memory storing instructions executable by the processor, and a display screen configured to act as a digital paper. Furthermore, the instructions, when executed by the processor, are configured to interpret the slit width data and the orientation data to dynamically control the amount of digital ink dispensed onto the digital paper. The computing device is further configured to adjust the stroke width and ink density on the digital paper based on the slit width and the position and tilt of the digital fountain pen, thereby simulating the writing experience and ink output of a stationery fountain pen.

An embodiment of the present disclosure relates to a method of writing on digital paper utilizing a digital fountain pen. The method includes the step of measuring a variable width of a slit between two tines of a nib of the digital fountain pen. The variable slit width varies in response to the pressure applied to the nib and/or the orientation of the digital fountain pen relative to a writing surface. Next, the method includes the step of detecting changes in capacitance between two capacitor plates incorporated within the two tines that vary with the varying slit width. The two tines of the nib of the digital fountain pen are made of a metal alloy that provides both flexibility and durability, allowing consistent performance under varying pressure and orientation.

Next, the method includes the step of converting the detected capacitance changes into digital signals representing the slit width. In an embodiment, the method includes the step of measuring resonant frequency changes caused by variations in the slit width, with the resonant frequency changes being converted into corresponding slit width measurements. In another embodiment, the method includes the steps of detecting the frequency shifts corresponding to changes in the slit width and converting them into the slit width data. In yet another embodiment, the method includes the step of comparing the capacitance of the slit width with a reference capacitor to detect variations in the slit width. In yet another embodiment, the method includes the step of measuring a time constant of a capacitor charging and discharging through a resistor that is indicative of the slit width. Next, the method includes the step of determining the position and tilt of the digital fountain pen relative to the writing surface, to provide orientation data including X coordinate, Y coordinate, XTilt angle, and/or YTilt angle.

Next, the method includes the step of transmitting, by the digital fountain pen, the slit width data and/or the orientation data to a computing device. Next, the method includes the step of receiving, by computing device, the slit width data and the orientation data from the digital fountain pen. Next, the method includes the step of interpreting the slit width data and the orientation data to dynamically control the amount of digital ink dispensed onto the digital paper.

Thereafter, the method includes the step of adjusting the stroke width and ink density on the digital paper based on the slit width and the position and tilt of the digital fountain pen, thereby simulating the writing experience and ink output of a stationery fountain pen. In an embodiment, the method includes the step of utilizing a pre-defined constant pertaining to the nib's tip width in combination with the slit width data to compute the stroke width.

The features and advantages of the present disclosure will become more apparent in light of the following detailed description of selected embodiments, as illustrated in the accompanying FIGURES. As will be realized, the subject matter disclosed is capable of modifications in various respects, all without departing from the scope of the subject matter. Accordingly, the drawings and the descriptions are to be regarded as illustrative in nature.

BRIEF DESCRIPTION OF THE DRAWINGS

In the FIGURES, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
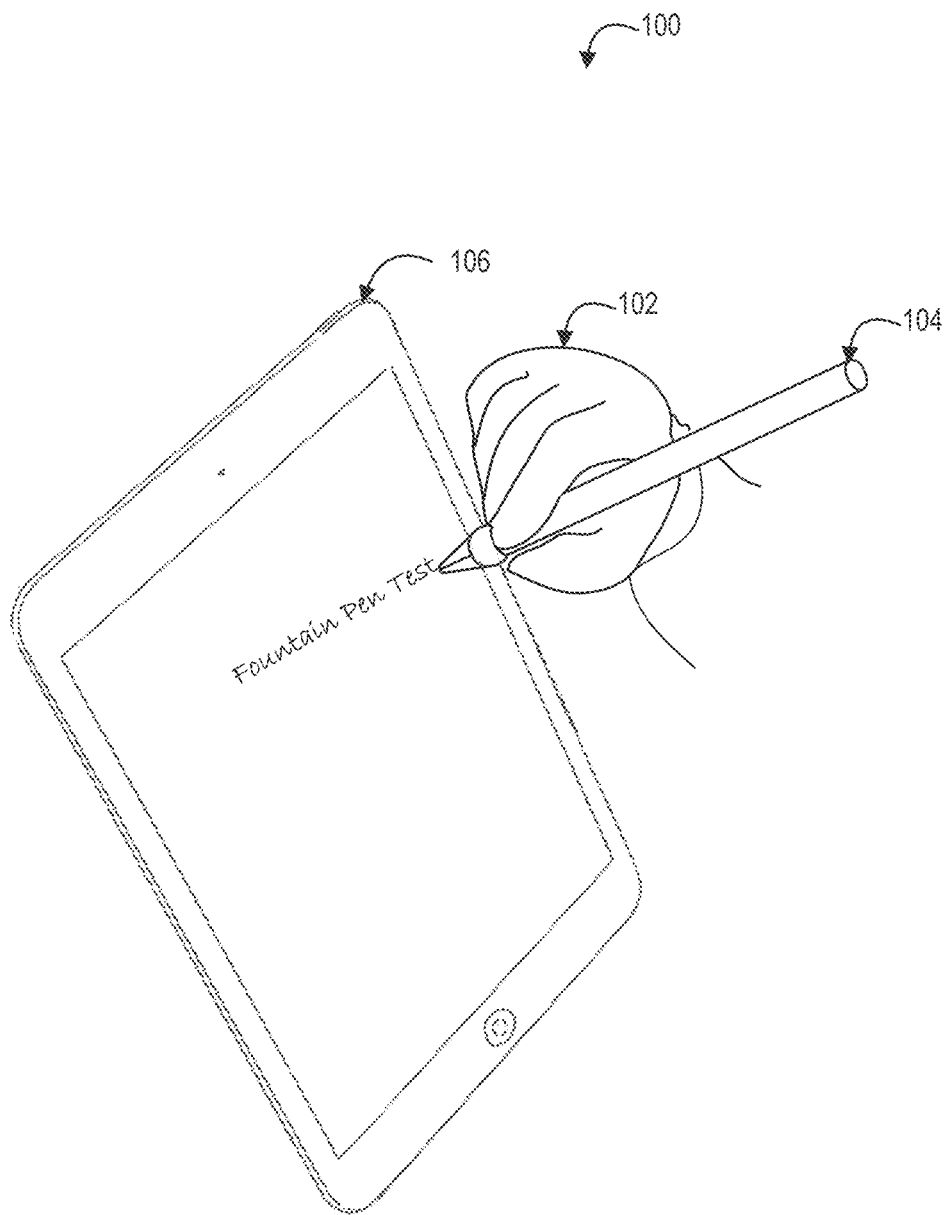
FIG. 1 illustrates a system for writing on digital paper utilizing a digital fountain pen, in accordance with various embodiments of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions stored in non-transitory medium, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a non-transitory machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the FIGURES may be provided through the use of dedicated hardware as well as hardware capable of executing associated software. Similarly, any switches shown in the FIGURES are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

One or more embodiments are directed to a digital fountain pen, and a system and method utilizing the same. The digital fountain pen and associated mechanism emulates the writing experience of a traditional stationery fountain pen, addressing the limitations of existing digital pens. In order to do so, the digital fountain pen has a specially designed nib and advanced sensing technology to replicate the tactile and visual aspects of fountain pen writing. This nib consists of two tines made from a flexible material, with a slit between them whose width varies depending on the pressure applied and the orientation of the digital fountain pen relative to a writing surface. Further, this variation in slit width is utilized for selecting the ink flow and stroke width to mimic the behavior of the traditional fountain pen's nib.

For accurately capturing and utilizing the variations in slit width, the digital fountain pen is equipped with a sensor module. The sensor module includes capacitor plates embedded within the two tines of the nib, such that as the slit width changes, the capacitance between these plates varies, which is then detected by an electronic circuit. Various methods can be employed to measure these capacitance changes, including LRC circuits, oscillator circuits, bridge circuits (like the Wheatstone bridge), time constant measurement techniques, and specialized integrated circuits designed for capacitance sensing. These measurements are converted into digital signals that represent the real-time slit width. In addition to the sensor module for measuring slit width, the digital fountain pen also includes an orientation detection module that determines the position and tilt of the digital fountain pen, providing data such as X and Y coordinates and XTilt and/or YTilt angles. This comprehensive set of data allows for precise control over the writing dynamics, as the computing device, i.e., digital writing pads (such as tablets, electronic boards, pen tablets, and the like) can adjust the stroke width and ink density based on both the slit width and the pen's orientation.

For such adjustments, the digital fountain pen communicates the slit width data and orientation data to the connected computing device through a communication module, which may utilize wireless communication protocols for seamless data transmission. The computing device, equipped with a processor and memory, interprets the received data to control the digital ink output on a display screen that functions as digital paper. The software dynamically adjusts the stroke width and ink density, creating an authentic writing experience that closely mirrors that of using a traditional fountain pen.

FIG. 1 illustrates a system 100 for writing on digital paper utilizing a digital fountain pen 104, in accordance with various embodiments of the present disclosure. The system 100 may include the digital fountain pen 104 accessible by a user 102 for writing on a computing device 106. It may be apparent to a person skilled in the art that the system 100 may mimic the use of a traditional fountain pen while leveraging the advantages of digital technology. As a result, the user 102 may get a writing or drawing experience that may feel natural and closely resembles the use of a traditional fountain pen. Further, the digital fountain pen 104 may have a nib with two tines made of a flexible material.

The two tines may create a slit whose width may vary in response to pressure and orientation. It may be understood that this variable slit width may be a key factor in emulating the ink flow of a traditional fountain pen in a digital environment. Further, the two tines of the digital fountain pen 104 may be fitted with two capacitor plates, such that the capacitance may be a variable dependent on the width of the slit, such that the slit width may be determined by measuring the capacitance between the capacitor plates filter in the two tines. Further, the digital fountain pen 104 may also track position and tilt of the slit in terms of X and Y Coordinates and/or XTilt and YTilt angles. The digital fountain pen 104 will be explained in detail in the following paragraphs.

In an embodiment, the computing device 106 may correspond to a digital-writing pad, such as tablets, electronic boards, pen tablets, and the like, that may provide or serve as digital paper. The computing device 106 may include a display screen that may act as a digital writing surface and maybe a touch-sensitive screen to detect the presence and movement of the digital fountain pen 104. Further, the computing device 106 may receive the measured slit width, position, and or tilt data to interpret the slit width data and orientation data to dynamically control the digital ink flow. The computing device 106 may adjust the stroke width and ink density to reflect the pressure and angle variations, simulating the experience of writing with a fountain pen. The computing device 106 and its operation will be explained in detail in the following paragraphs.

In operation, when the user 102 begins to write or draw then the user 102 may apply pressure to the nib, causing the two tines to flex and the slit width to vary. Simultaneously, the orientation detection module may track the pen's position and tilt. During such a process of writing and/or drawings, the sensor module may measure the capacitance changes between the capacitor plates and convert these measurements into digital signals representing the slit width. Then, this data along with the orientation data may be transmitted wirelessly to the computing device 106. The computing device 106 may receive the data and then processes it to determine the appropriate digital ink output to adjust the stroke width and ink density based on the slit width and pen orientation, rendering the strokes on the display screen. In an embodiment, as the user 102 writes or draws, the user 102 may see the results immediately on the screen of the computing device 106 making the experience smooth and responsive. Further, such a seamless integration of the digital fountain pen 104 with the computing device 106 may ensure that the user experiences a highly realistic and satisfying digital writing environment. The precise measurement of slit width variations and pen orientation may allow for accurate simulation of traditional fountain pen behavior, while the digital platform offers additional benefits such as editing, saving, and sharing the work.

Figure 2A:
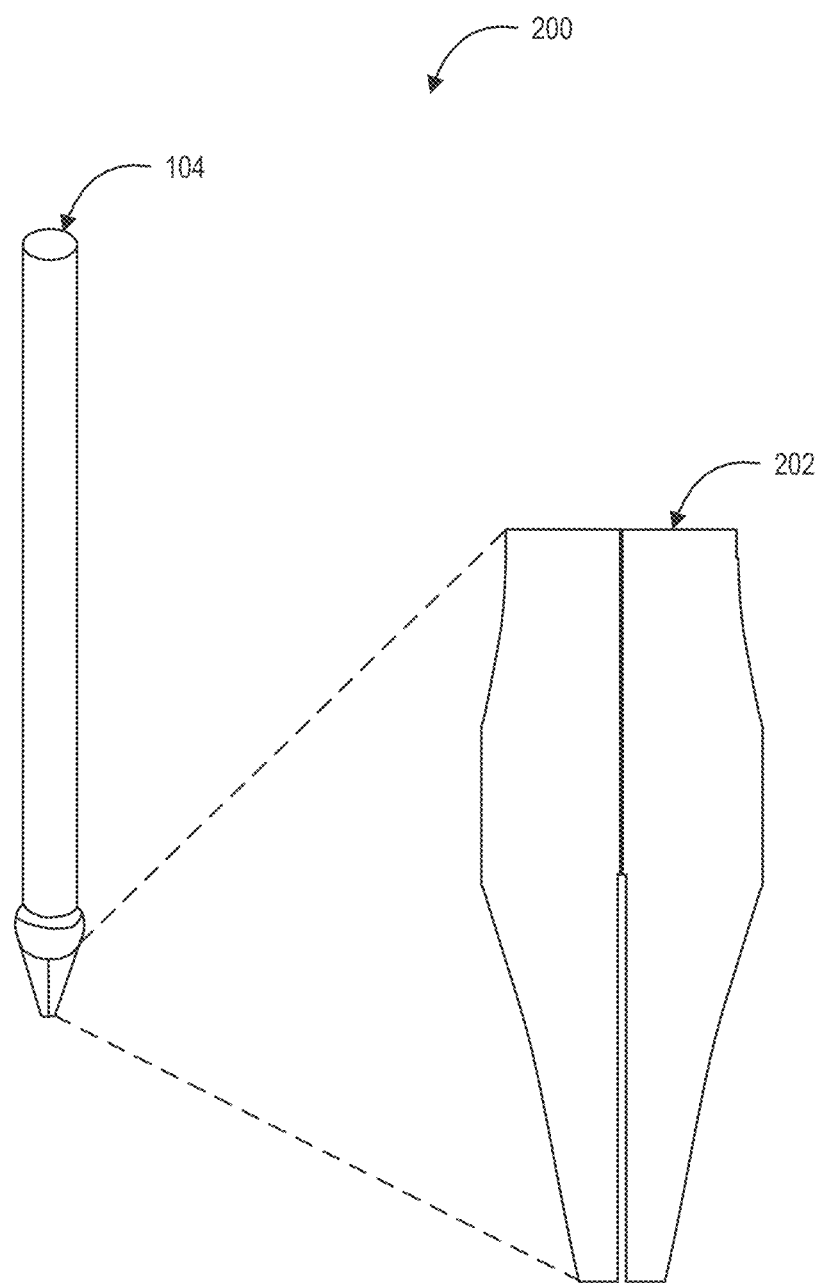
FIG. 2A illustrates a detailed view of the digital fountain pen, in accordance with an embodiment of the present disclosure.
Figure 2B:
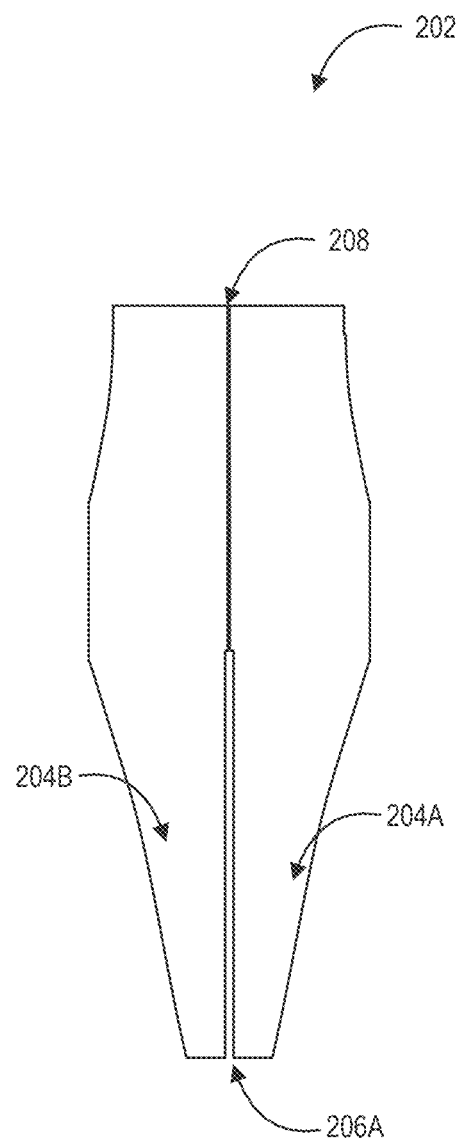
FIG. 2B illustrates a nib of the digital fountain pen, in accordance with an embodiment of the present disclosure.
Figure 2C:
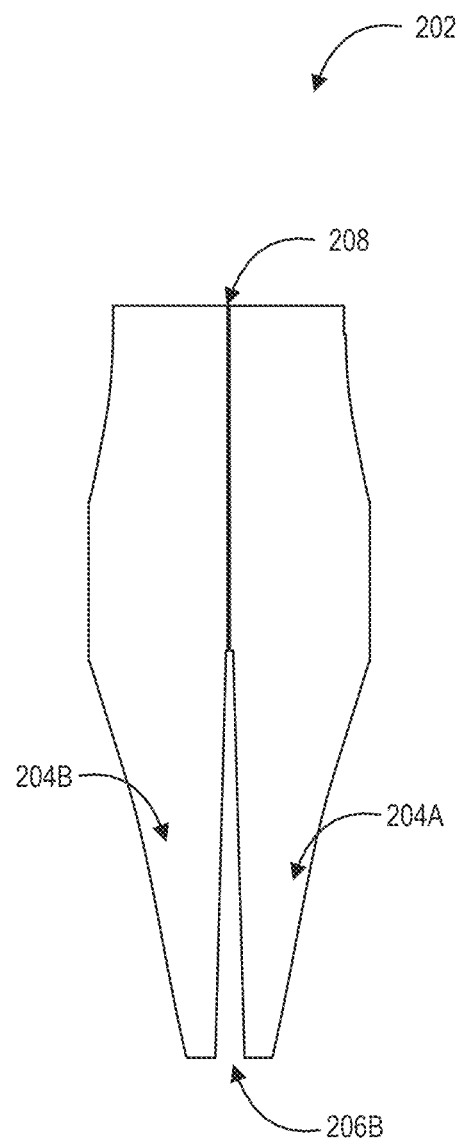
FIG. 2C illustrates the nib of the digital fountain pen with increased slit width, in accordance with an embodiment of the present disclosure.

FIG. 2A illustrates a detailed view 200 of the digital fountain pen 104, in accordance with an embodiment of the present disclosure. FIG. 2B illustrates a nib 202 of the digital fountain pen 104, in accordance with an embodiment of the present disclosure. FIG. 2C illustrates the nib 202 of the digital fountain pen 104 with increased slit width, in accordance with an embodiment of the present disclosure. For the sake of brevity, FIGS. 2A, 2B, and 2C will be explained together.

In an embodiment, the digital fountain pen 104 may include a body, as shown in the general state of art, and a nib 202 for writing on the digital writing surface, as shown in FIG. 2A. Further, as shown in FIG. 2B, the nib 202 of the digital fountain pen 104 may have two tines 204A and 204B that may be made of a flexible material and may be smooth and soft such that the two tines 204A and 204B shall not scratch the surface of the digital writing pad during writing and/or drawing. Also, the two tines 204A and 204B may have a gap between them defining a slit 206A (also, numbered as 206). Since the material of the two tines 204A and 204B is flexible, the slit may have a variable slit width that may vary in response to pressure applied to the nib 202 and/or orientation of the digital fountain pen 104 relative to a writing surface. For example, if more pressure is applied to the slit 206A, then the slit width may increase as shown by 206B in FIG. 2C. Additionally, the two tines 204A and 204B may be attached on an upper end 208 where the nib 202 is attached to the body of the digital fountain pen 104. In an embodiment, the two tines 204A and 204B of the nib 202 may be made of a metal alloy that provides both flexibility and durability, allowing consistent performance under varying pressure and orientation.

In an embodiment, the digital fountain pen 104 may also include a sensor module to measure the variable slit width. The sensor module may include two capacitor plates incorporated within the two tines 204A and 204B of the nib 202. Thus, a capacitance may be developed between the two tines 204A and 204B of the nib 202 that may be proportional to the slit width, such that when the slit width increases or decreases then the capacitance may increase or decrease. Further, the sensor module may include an electronic circuit for detecting changes in such capacitance between the two capacitor plates as the slit width varies. In an embodiment, the sensor module may include an LRC circuit configured to measure resonant frequency changes caused by variations in the slit width, such that the resonant frequency changes may be converted into corresponding slit width measurements. In another embodiment, the sensor module may include an oscillator circuit to detect frequency shifts corresponding to changes in the slit width, such that the frequency shifts may be converted into the slit width data. In yet another embodiment, the sensor module may include a bridge circuit to compare the capacitance of the slit width with a reference capacitor for detecting variations in the slit width. In yet another embodiment, the sensor module may be configured to measure a time constant of a capacitor charging and discharging through a resistor that may be indicative of the slit width. Further, the sensor module may include a digital converter for converting the detected capacitance into digital signals representing the slit width.

In an embodiment, the digital fountain pen 104 may also include an orientation detection module to determine position and tilt of the digital fountain pen relative to the writing surface to provide orientation data. The orientation data includes at least one of X coordinate, Y coordinate, XTilt angle, and/or YTilt angle. In an embodiment, the orientation detection module may include a combination of accelerometers, gyroscopes, and/or magnetometers, which may work together to measure the pen's X and Y coordinates as well as the XTilt and YTilt angles. By continuously monitoring these parameters, the orientation detection module may ensure that every subtle movement and tilt of the pen is captured and translated into digital data. Such data may be crucial for the computing device 106 to dynamically adjust the stroke width and ink flow, replicating the nuanced effects of a traditional fountain pen, as may be discussed in the following paragraphs.

In an embodiment, the digital fountain pen 104 may also include a communication module to transmit the slit width data and/or the orientation data to the connected computing device 106. The communication module employs wireless communication protocols, such as Bluetooth or Wi-Fi, to transmit the slit width data and orientation data to the connected computing device. The robust and low-latency nature of the communication module may ensure that every nuance of the user's handwriting or drawing is captured and rendered instantaneously on the digital screen. Further, the computing device 106 may utilize the slit width data and the orientation data to dynamically control an amount of digital ink dispensed onto a digital paper, thereby simulating the writing experience and ink output of a stationery fountain pen. The computing device 106 dynamically controls the amount of digital ink dispensed onto the digital paper by adjusting stroke width and ink density on the digital paper based on interpretation of the slit width data and orientation data. In an embodiment, the nib's tip width and/or shape may be a pre-defined constant conveyed to the computing device 106, such that the computing device 106 may utilizes the pre-defined constant in combination with the slit width data to compute the stroke width.

Figure 3A:
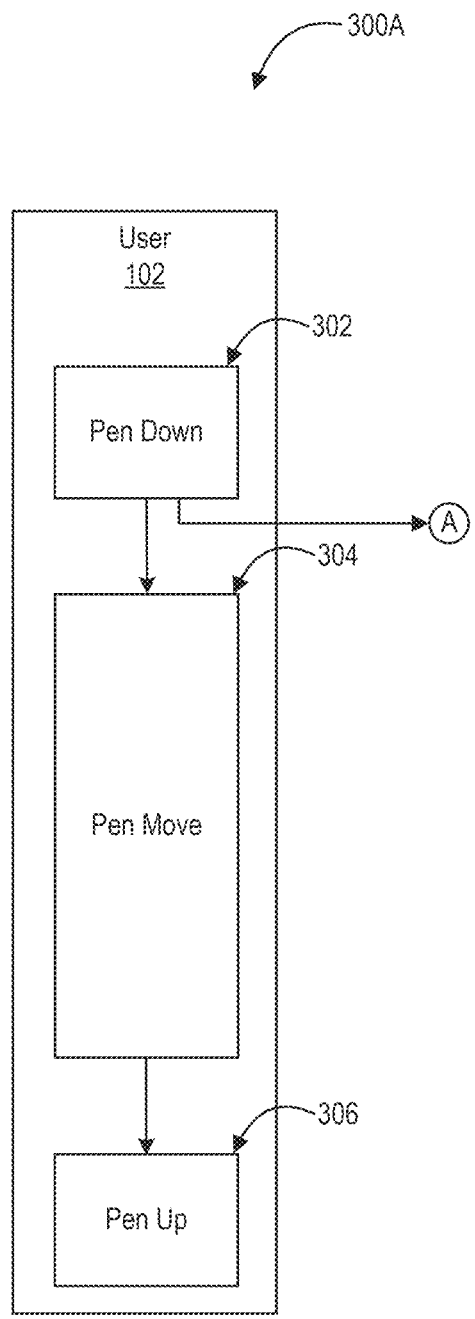
FIG. 3A illustrates a flow diagram of operation performed at user end, in accordance with an embodiment of the present disclosure.

FIG. 3A illustrates a flow diagram 300A of operation performed at user end, in accordance with an embodiment of the present disclosure. In an embodiment, when the user 102 uses the digital fountain pen 104, the user 102 may perform a series of operations, such as pen down 302 initiating the active connection between the digital fountain pen 104 and the digital writing pad, pen move 304 for writing or drawing with the digital fountain pen 104 on the digital writing pad, and pen up 306 for aborting the active connection between the digital fountain pen 104 and the digital writing pad.

Figure 3B:
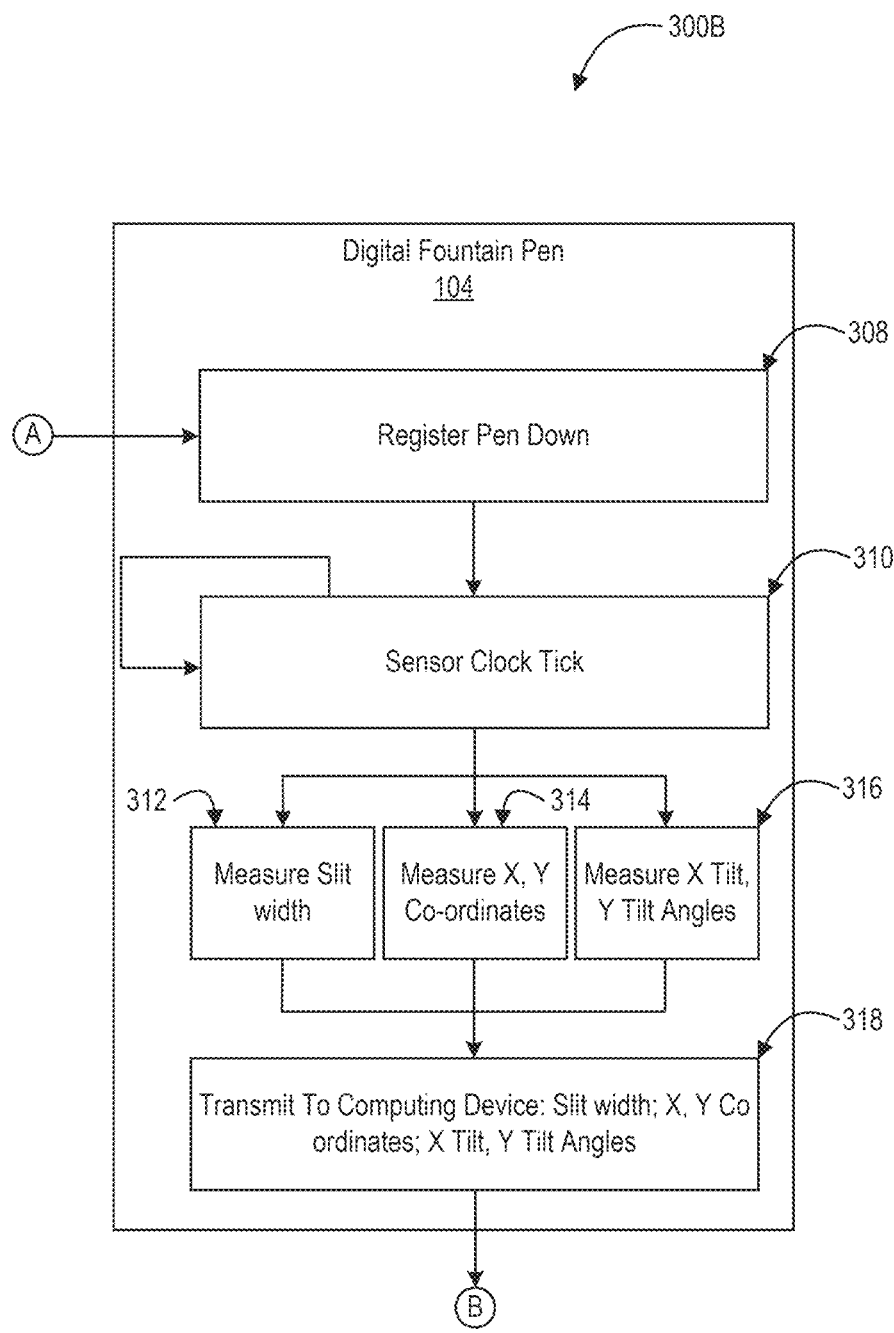
FIG. 3B illustrates a flow diagram of operation performed at the digital fountain pen end, in accordance with an embodiment of the present disclosure.

FIG. 3B illustrates a flow diagram 300B of operation performed at the digital fountain pen end, in accordance with an embodiment of the present disclosure. When the user 102 performs the pen down operation 302, the digital fountain pen may register pen down 308 and initiate its sensors, as shown by 310, for continuous monitoring and measurements of variables of the digital fountain pen 104. Further, during the pen move operation by the user, the sensor module of the digital fountain pen 104 may measure slit width 312 and the orientation detection module may measure X and Y coordinates 314 and X Tilt and Y Tilt angles 316. Upon measuring the slit width data and the orientation data including X and Y coordinates and XTilt and YTilt angles, the digital fountain pen 104 may transmit the measured data to the computing device 106.

Figure 3C:
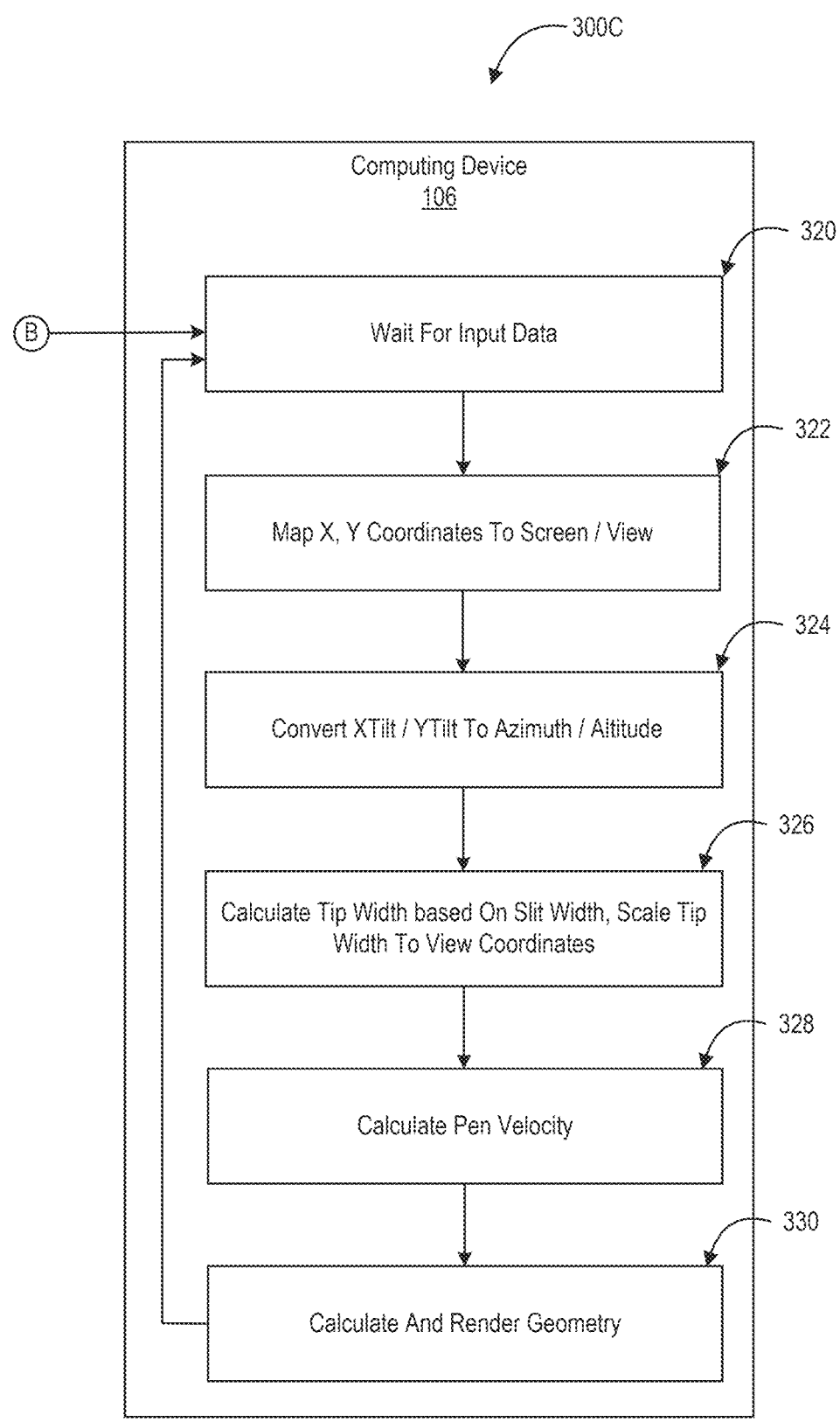
FIG. 3C illustrates a flow diagram of operation performed at computing device end, in accordance with an embodiment of the present disclosure.
Figure 4:
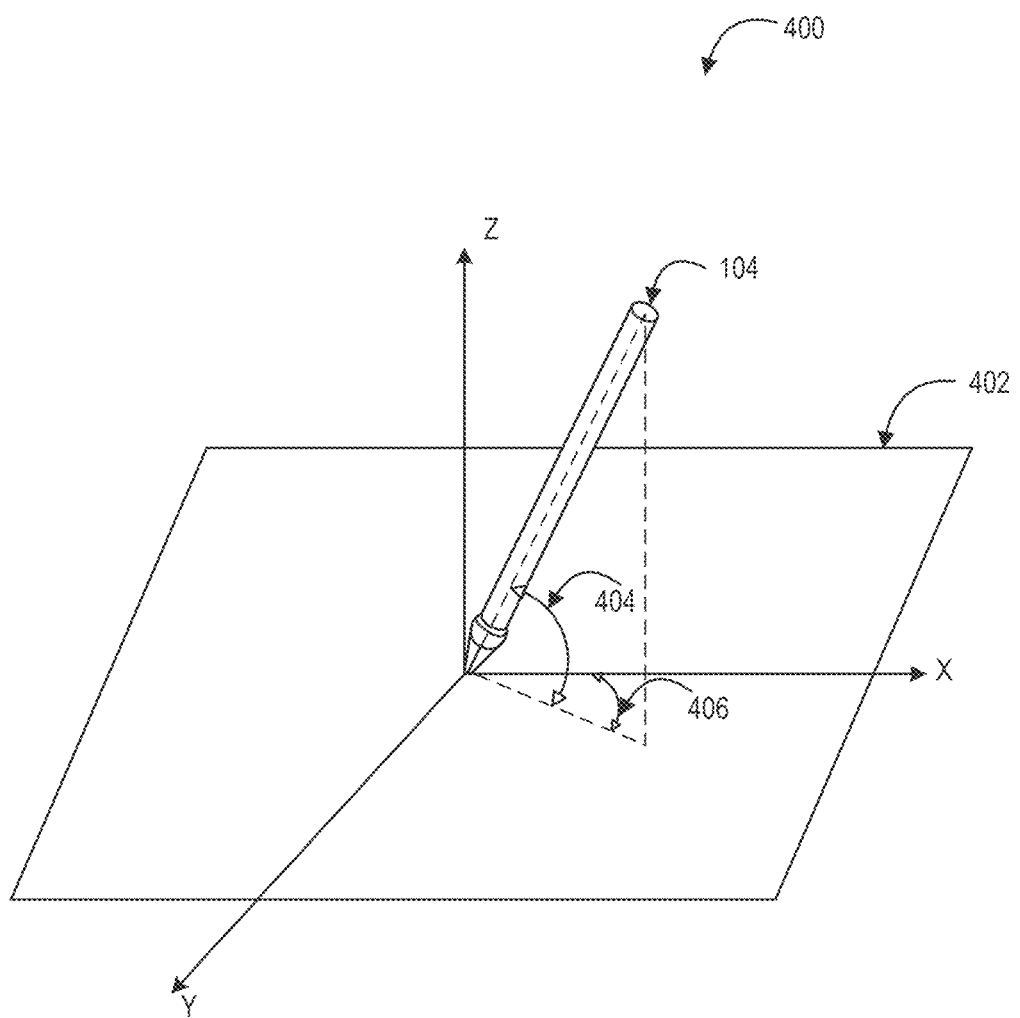
FIG. 4 illustrates a plane showing an altitude and an azimuth between the digital fountain pen and the writing surface, in accordance with an embodiment of the present disclosure.

FIG. 3C illustrates a flow diagram 300C of operation performed at computing device end, in accordance with an embodiment of the present disclosure. FIG. 4 illustrates a plane 400 showing an altitude and an azimuth between the digital fountain pen and the writing surface 402, in accordance with an embodiment of the present disclosure. For the sake of brevity, FIGS. 3C and 4 will be explained together.

The computing device 106 may remain in a receptive state, ready to process new information as soon as it is received, ensuring a real-time response to the user's writing or drawing actions. Accordingly, the computing device 106 may receive input data transmitted from the digital fountain pen 104, as shown by 320. Next, at step 322, upon receiving the data from the digital fountain pen 104, the computing device 106 may map X and Y coordinates to the corresponding positions on the display screen. It may be apparent to a person skilled in the art that this may involve converting the digital fountain pen's physical position data into the appropriate pixel positions on the digital writing surface, ensuring that the user's movements are accurately reflected on the screen. Next, at step 324, the computing device 106 may convert the XTilt and YTilt angles, which indicate the tilt of the pen, are converted into azimuth 406 and altitude 404 angles. It may be apparent to a person skilled in the art that the azimuth 406 may refer to the angular deviation in the horizontal plane, while the altitude 404 may refer to the angle in the vertical plane.

Next, at step 326, the slit width data from the digital fountain pen 104 may be used to calculate the effective tip width of the nib 202. The calculated tip width may then be scaled to the view coordinates of the display, ensuring that the stroke width rendered on the screen accurately represents the pressure and flex of the pen's nib, similar to how a real fountain pen's ink flow would vary. Next, at step 328, the computing device 106 may calculate the velocity of the pen by analyzing the change in X and Y coordinates over time. Such a calculation may involve measuring the distance traveled by the pen's nib in a given time interval. It may be apparent to a person skilled in the art that the pen velocity may be an important factor in determining the ink flow rate and the appearance of the stroke because, for example, faster movements may result in thinner, lighter strokes, while slower movements may produce thicker, denser lines. Thereafter, at step 330, the computing device 106 may use the mapped coordinates, converted tilt angles, calculated tip width, and pen velocity, to calculate and generate the geometry of the stroke. In an embodiment, such generation may involve creating the visual representation of the line on the digital canvas, such that the rendering process may take into account all the dynamic variables to produce a stroke that mimics the natural ink flow and variation seen with a traditional fountain pen.

Figure 5A:
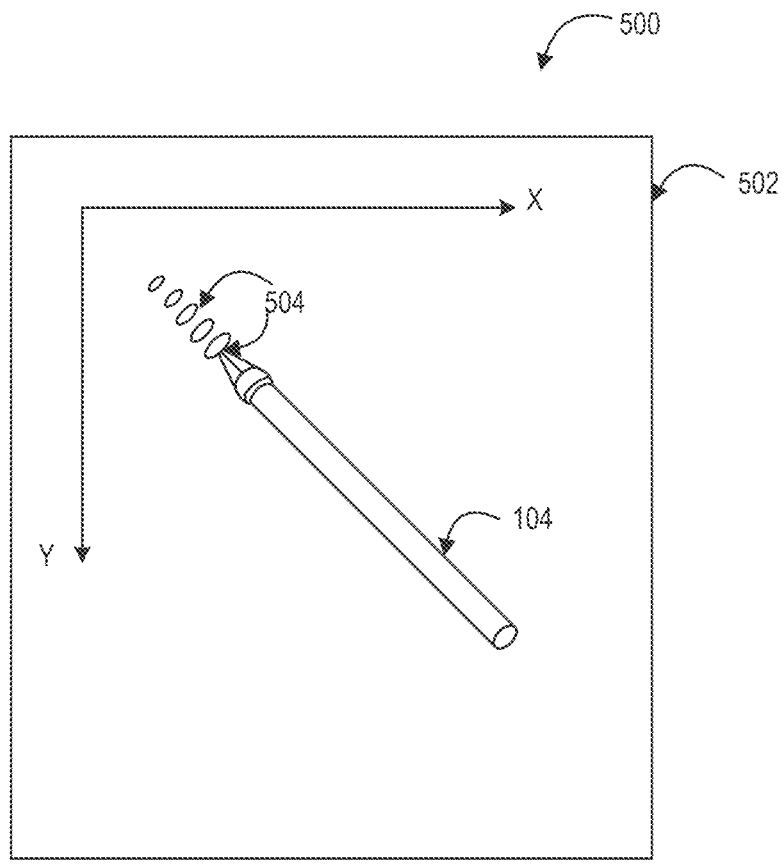
FIG. 5A illustrates a writing surface with a first exemplary ink stroke, in accordance with an embodiment of the present disclosure.
Figure 5B:
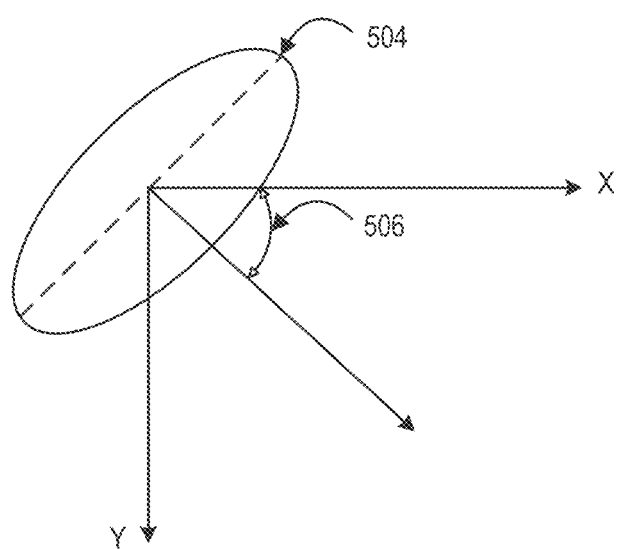
FIG. 5B illustrates a shape of the first exemplary ink stroke, in accordance with an embodiment of the present disclosure.
Figure 6A:
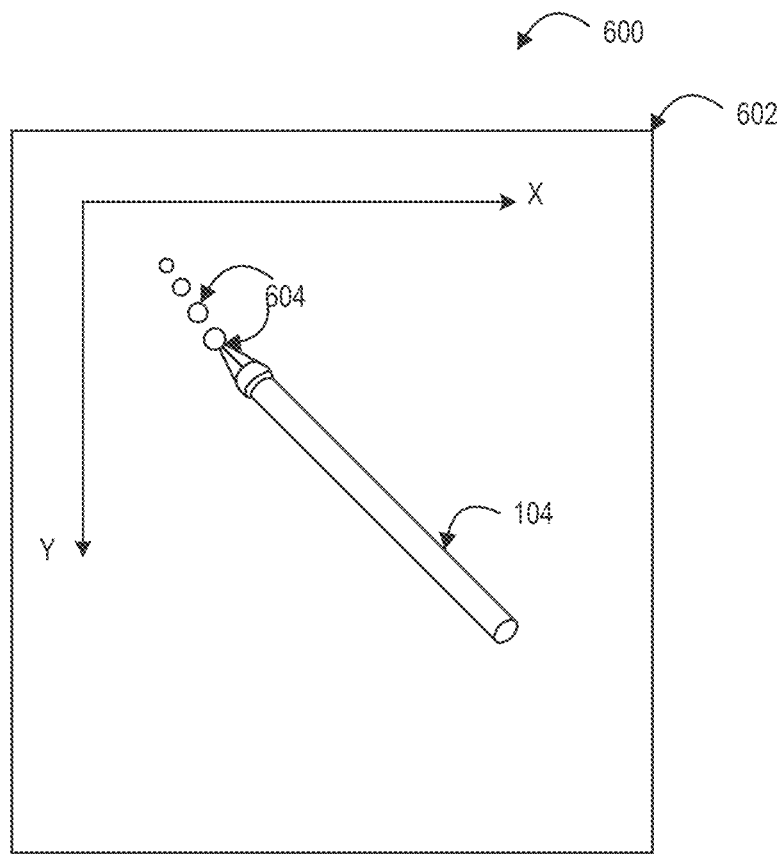
FIG. 6A illustrates a writing surface with a second exemplary ink stroke, in accordance with an embodiment of the present disclosure.
Figure 6B:
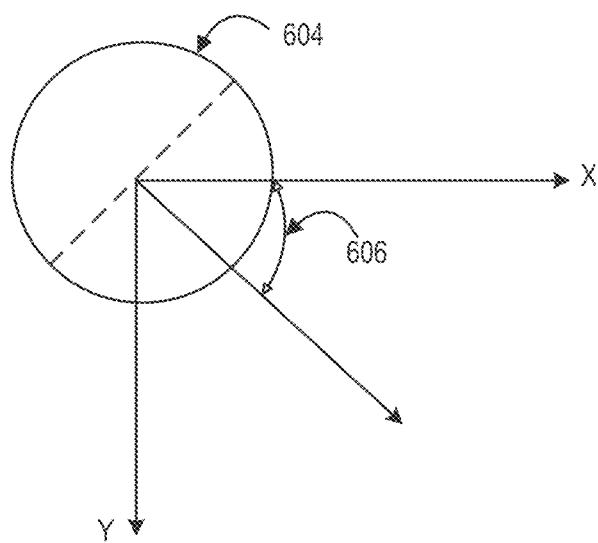
FIG. 6B illustrates a shape of the second exemplary ink stroke, in accordance with an embodiment of the present disclosure.

FIG. 5A illustrates an example 500 of a writing surface 502 with a first exemplary ink stroke 504, in accordance with an embodiment of the present disclosure. FIG. 5B illustrates a shape of the first exemplary ink stroke 504, in accordance with an embodiment of the present disclosure. FIG. 6A illustrates another example 600 of a writing surface 602 with a second exemplary ink stroke 604, in accordance with an embodiment of the present disclosure. FIG. 6B illustrates a shape of the second exemplary ink stroke, in accordance with an embodiment of the present disclosure. For the sake of brevity, FIGS. 5A, 5B, 6A, and 6B will be explained together.

In an embodiment of the present disclosure, the ink strokes may be constructed of samples that can be of various shapes, for example, ellipse, as shown in FIGS. 5A and 5B, and circle, as shown in FIGS. 6A and 6B. In an embodiment, as shown in FIGS. 5A and 5B, a plurality of ellipses can be connected together to form a continuous shape or can be rendered as separate particles. Further, the angle of rotation of each ellipse may be equal to the azimuth angle 506 of the digital fountain pen 104 at the moment of sampling. Further, the longer (major) axis of the ellipse may be scaled to be equal to the tip width at the moment of sampling and, thus, varying tip width may produce an ink stroke with varying width. In another embodiment, as shown in FIGS. 6A and 6B, a plurality of circles can be connected together to form a continuous shape or can be rendered as separate particles. Further, the angle of rotation of each circle may be equal to the azimuth angle 606 of the digital fountain pen 104 at the moment of sampling. Further, the diameter of the circle may be scaled to be equal to the tip width at the moment of sampling and, thus, varying tip width may produce an ink stroke with varying width. It may be apparent to a person skilled in the art that the shape of the ink strokes may be selected differently from ellipse and circle, such as square, rectangle, or the like, without departing from the scope of the present disclosure.

Figure 7:
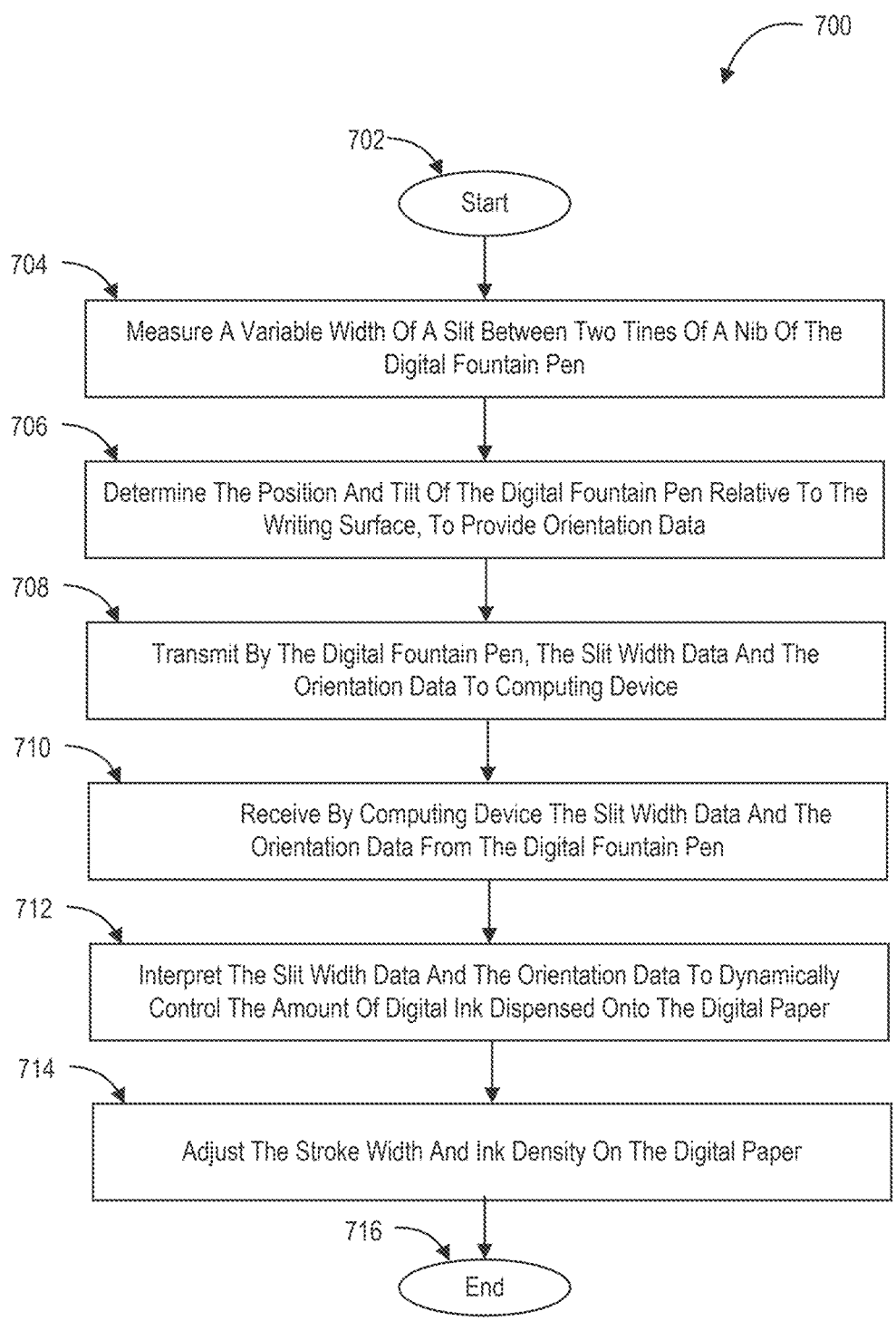
FIG. 7 illustrates a flowchart of a method of writing on digital paper utilizing a digital fountain pen, in accordance with an embodiment of the present disclosure.

FIG. 7 illustrates a flowchart 700 of a method of writing on digital paper utilizing a digital fountain pen, in accordance with an embodiment of the present disclosure. The method may start at step 702.

At first, a variable width of a slit between two tines of a nib of the digital fountain pen may be measured, at step 704. The variable slit width may vary in response to pressure applied to the nib and/or orientation of the digital fountain pen relative to a writing surface. The method may include the steps of detecting changes in capacitance between two capacitor plates incorporated within the two tines that varies with the varying slit width. The two tines of the nib of the digital fountain pen may be made of a metal alloy that may provide both flexibility and durability, allowing consistent performance under varying pressure and orientation. The method may also include the steps of converting the detected capacitance changes into digital signals representing the slit width. In an embodiment, the method may include the steps of measuring resonant frequency changes caused by variations in the slit width, with the resonant frequency changes being converted into corresponding slit width measurements. In another embodiment, the method may include the steps of detecting the frequency shifts corresponding to changes in the slit width and converting into the slit width data. In yet another embodiment, the method may include the steps of comparing the capacitance of the slit width with a reference capacitor to detect variations in the slit width. In yet another embodiment, the method may include the steps of measuring a time constant of a capacitor charging and discharging through a resistor that is indicative of the slit width. Next, at step 706, the method may include the steps of determining the position and tilt of the digital fountain pen relative to the writing surface, to provide orientation data including X coordinate, Y coordinate, XTilt angle, and/or YTilt angle.

Next, at step 708, the slit width data and/or the orientation data may be transmitted, by the digital fountain pen, to computing device. Next, at step 710, the slit width data and/or the orientation data may be received, by computing device, from the digital fountain pen. Next, at step 712, the slit width data and/or the orientation data may be interpreted to dynamically control the amount of digital ink dispensed onto the digital paper.

Thereafter, at step 714, the stroke width and ink density may be adjusted on the digital paper based on the slit width and the position and tilt of the digital fountain pen, thereby simulating the writing experience and ink output of a stationery fountain pen. In an embodiment, the method may include the steps of utilizing a pre-defined constant pertaining to the nib's tip width in combination with the slit width data to compute the stroke width. The method may end at step 716.

Figure 8:
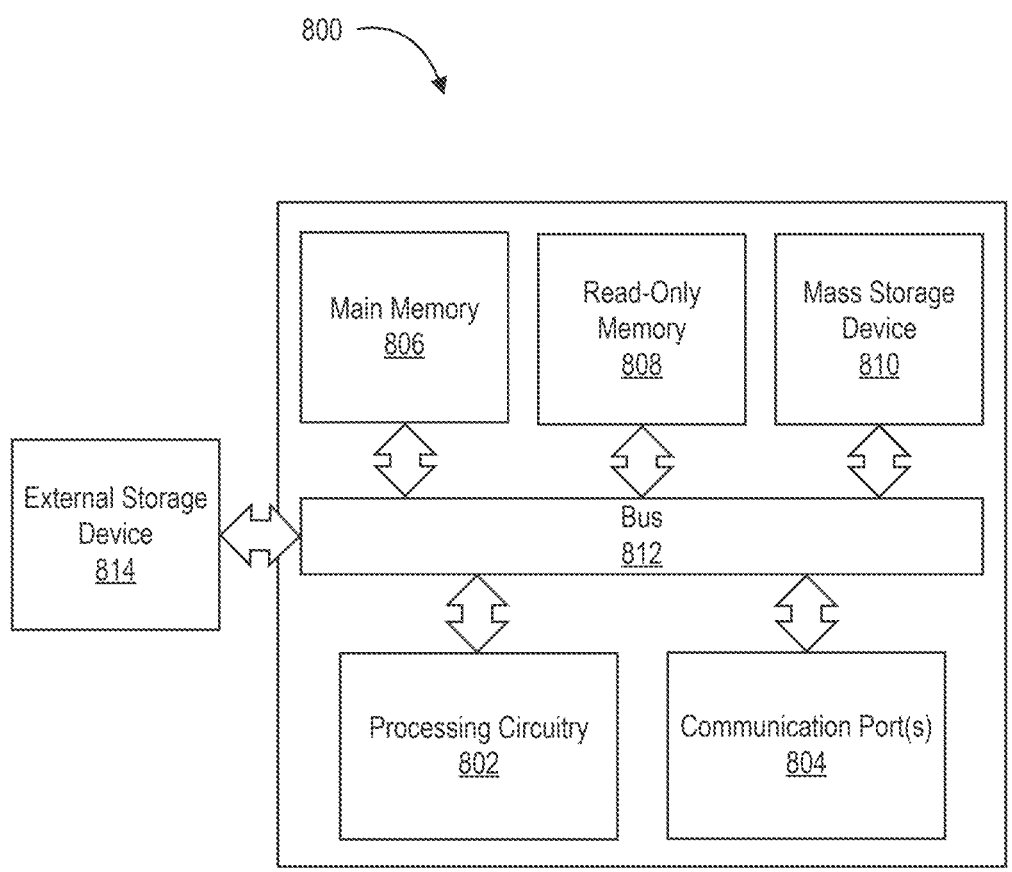
FIG. 8 illustrates an exemplary computer system in which or with which embodiments of the present disclosure may be utilized.

FIG. 8 illustrates an exemplary computer system in which or with which embodiments of the present disclosure may be utilized. As shown in FIG. 8, a computer system 800 includes an external storage device 814, a bus 812, a main memory 806, a read-only memory 808, a mass storage device 810, a communication port 804, and a processing circuitry (processor) 802.

Those skilled in the art will appreciate that the computer system 800 may include more than one processing circuitry (processor) 802 and communication ports 804. Examples of processor 802 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 802 may include various modules associated with embodiments of the present disclosure.

Communication port 805 can be any of an RS-232 port for use with a modem-based dialup connection, a 10/100 Ethernet port, a Gigabit or 10 Gigabit port using copper or fiber, a serial port, a parallel port, or other existing or future ports. Communication port 812 may be chosen depending on a network, such as a Local Area Network (LAN), Wide Area Network (WAN), or any network to which the computer system connects.

Memory 806 can be Random Access Memory (RAM), or any other dynamic storage device commonly known in the art. Read-Only Memory 808 can be any static storage device(s) e.g., but not limited to, a Programmable Read-Only Memory (PROM) chips for storing static information e.g., start-up or BIOS instructions for processor 802.

Mass storage 810 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 812 communicatively couples processor(s) 802 with the other memory, storage, and communication blocks. Bus 812 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 802 to a software system.

Optionally, operator and administrative interfaces, e.g., a display, keyboard, and a cursor control device, may also be coupled to bus 812 to support direct operator interaction with the computer system. Other operator and administrative interfaces can be provided through network connections connected through communication port 804. An external storage device 814 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

The invention claimed is:

1. A digital fountain pen, comprising:
    a nib having two tines made of a flexible material, wherein the two tines define a slit with a variable slit width that varies in response to at least one of: a pressure applied to the nib or orientation of the digital fountain pen relative to a writing surface;
    a sensor module configured to measure the variable slit width;
    an orientation detection module configured to determine a position and tilt of the digital fountain pen relative to the writing surface to provide orientation data including at least one of: X coordinate, Y coordinate, XTilt angle, or YTilt angle; and
    a communication module configured to transmit at least one of: the slit width data or the orientation data to a connected computing device, wherein the computing device utilizes the slit width data and/or the orientation data to dynamically control an amount of digital ink dispensed onto a digital paper, thereby simulating a writing experience and ink output of a stationery fountain pen.

2. The digital fountain pen of claim 1, wherein the sensor module comprises:
   two capacitor plates incorporated within the two tines;
   an electronic circuit that detects changes in capacitance between the two capacitor plates as the slit width varies; and
   a digital converter that converts the detected capacitance into digital signals representing the slit width.

3. The digital fountain pen of claim 2, wherein the sensor module comprises an LRC circuit configured to measure resonant frequency changes caused by variations in the slit width, with the resonant frequency changes being converted into corresponding slit width measurements.

4. The digital fountain pen of claim 2, wherein the sensor module comprises an oscillator circuit configured to detect frequency shifts corresponding to changes in the slit width, with the frequency shifts being converted into the slit width data.

5. The digital fountain pen of claim 2, wherein the sensor module comprises a bridge circuit configured to compare the capacitance of the slit width with a reference capacitor for detecting variations in the slit width.

6. The digital fountain pen of claim 2, wherein the sensor module measures a time constant of a capacitor charging and discharging through a resistor, wherein the time constant is indicative of the slit width.

7. The digital fountain pen of claim 1, wherein the two tines of the nib are made of a metal alloy that provides both flexibility and durability, allowing consistent performance under varying pressure and orientation.

8. The digital fountain pen of claim 1, wherein the communication module employs a wireless communication protocol to transmit the slit width data and/or the orientation data to the connected computing device.

9. The digital fountain pen of claim 1, wherein the computing device dynamically controls the amount of digital ink dispensed onto the digital paper by adjusting stroke width and ink density on the digital paper based on interpretation of the slit width data and/or the orientation data.

10. The digital fountain pen of claim 9, wherein the nib's tip width is a pre-defined constant conveyed to the computing device, such that the computing device utilizes the pre-defined constant in combination with the slit width data to compute the stroke width.

11. A system for writing on digital paper utilizing a digital fountain pen, the system comprising:
    (a) a digital fountain pen comprising:
       a nib having two tines made of a flexible material, wherein the two tines define a slit with a variable slit width that varies in response to at least one of: a pressure applied to the nib or orientation of the digital fountain pen relative to a writing surface;
       a sensor module configured to measure the variable slit width;
       an orientation detection module configured to determine a position and tilt of the digital fountain pen relative to the writing surface, to provide orientation data including at least one of: X coordinate, Y coordinate, XTilt angle, or YTilt angle; and
       a communication module configured to transmit at least one of: the slit width data or the orientation data; and
    (b) a computing device configured to receive the slit width data and/or the orientation data from the digital fountain pen, the computing device comprising:
       a processor;
       a memory storing instructions executable by the processor;
       a display screen configured to act as a digital paper;
       wherein the instructions, when executed by the processor, are configured to:
          interpret the slit width data and the orientation data to dynamically control an amount of digital ink dispensed onto the digital paper; and
          adjust the stroke width and ink density on the digital paper based on the slit width and/or the position and tilt of the digital fountain pen, thereby simulating a writing experience and ink output of a stationery fountain pen.

12. The system of claim 11, wherein the sensor module of the digital fountain pen comprises at least one of:
    two capacitor plates incorporated within the two tines, an electronic circuit that detects changes in capacitance between the capacitor plates as the slit width varies, and a digital converter that converts the detected capacitance changes into digital signals representing the slit width;
    an LRC circuit configured to measure resonant frequency changes caused by variations in the slit width, with the resonant frequency changes being converted into corresponding slit width measurements;
    an oscillator circuit configured to detect the frequency shifts corresponding to changes in the slit width, with the frequency shifts being converted into the slit width data; or
    a bridge circuit configured to compare the capacitance of the slit width with a reference capacitor for detecting variations in the slit width.

13. The system of claim 11, wherein the sensor module of the digital fountain pen measures a time constant of a capacitor charging and discharging through a resistor, wherein the time constant is indicative of the slit width.

14. The system of claim 11,
    wherein the two tines of the nib of the digital fountain pen are made of a metal alloy that provides both flexibility and durability, allowing consistent performance under varying pressure and orientation; and
    wherein the nib's tip width is a pre-defined constant conveyed to the computing device, such that the computing device utilizes the pre-defined constant in combination with the slit width data to compute the stroke width.

15. The system of claim 11, wherein the communication module of the digital fountain pen employs a wireless communication protocol to transmit the slit width data and/or the orientation data to the connected computing device.

16. A method of writing on digital paper utilizing a digital fountain pen, the method comprising:
    measuring a variable width of a slit between two tines of a nib of the digital fountain pen, wherein the variable slit width varies in response to at least one of: a pressure applied to the nib or orientation of the digital fountain pen relative to a writing surface;
    determining a position and tilt of the digital fountain pen relative to the writing surface, to provide orientation data including at least one of: X coordinate, Y coordinate, XTilt angle, or YTilt angle;

transmitting, by the digital fountain pen, at least one of: the slit width data or the orientation data to a computing device;

receiving, by computing device, the slit width data and/or the orientation data from the digital fountain pen;

interpreting the slit width data and/or the orientation data to dynamically control an amount of digital ink dispensed onto the digital paper; and adjusting stroke width and ink density on the digital paper based on the slit width and/or the position and tilt of the digital fountain pen, thereby simulating a writing experience and ink output of a stationery fountain pen.

17. The method of claim 16, comprising at least one of:

detecting changes in capacitance between two capacitor plates incorporated within the two tines that vary with the varying slit width, with the capacitance changes being converted into digital signals representing the slit width;

measuring resonant frequency changes caused by variations in the slit width, with the resonant frequency changes being converted into corresponding slit width measurements;

detecting frequency shifts corresponding to changes in the slit width, with the frequency shifts being converted into the slit width data; or comparing the capacitance of the slit width with a reference capacitor to detect variations in the slit width.

18. The method of claim 16, comprising measuring a time constant of a capacitor charging and discharging through a resistor, wherein the time constant is indicative of the slit width.

19. The method of claim 16, wherein the two tines of the nib of the digital fountain pen are made of a metal alloy that provides both flexibility and durability, allowing consistent performance under varying pressure and orientation.

20. The method of claim 16, comprising utilizing a pre-defined constant pertaining to the nib's tip width in combination with the slit width data to compute the stroke width.

* * * * *